Jan. 1, 1957 H. S. JACOBS ET AL 2,776,386

ELECTRIC-INDUCTION TORQUE TRANSMITTER

Filed Jan. 29, 1954 3 Sheets-Sheet 1

INVENTORS
Henry S. Jacobs
Matthew W. Tietze
BY
David A. Fox
ATTORNEY

Jan. 1, 1957 H. S. JACOBS ET AL 2,776,386
ELECTRIC-INDUCTION TORQUE TRANSMITTER
Filed Jan. 29, 1954 3 Sheets-Sheet 2
Fig. 3.
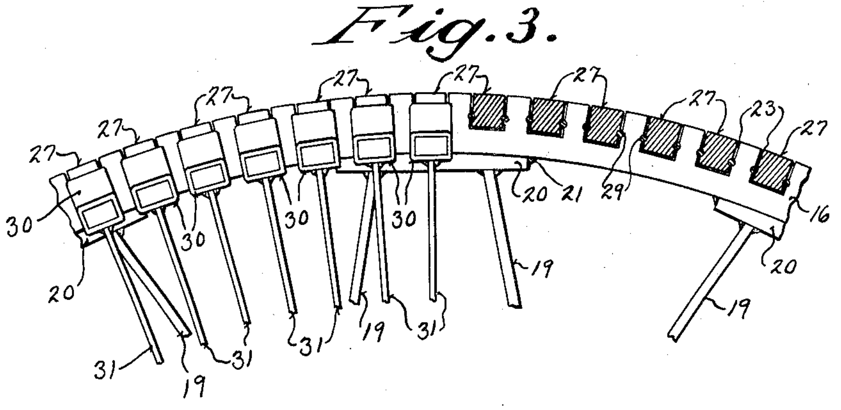
Fig. 4.
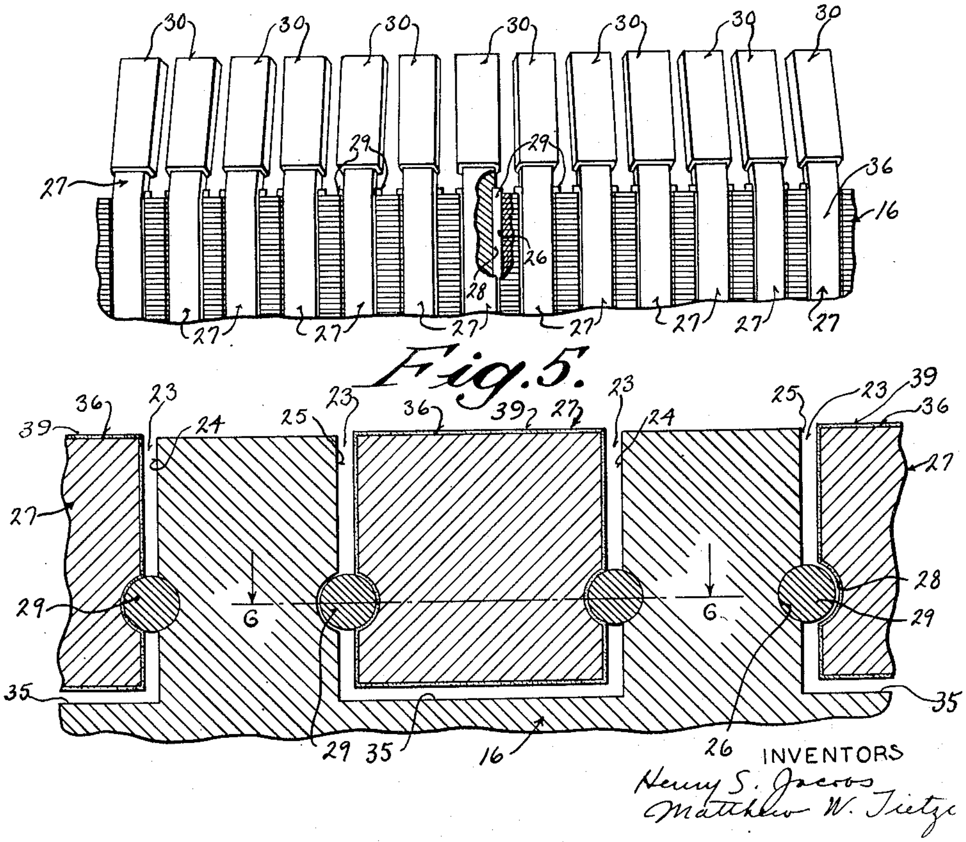
Fig. 4. Fig. 5.
INVENTORS
Henry S. Jacobs
Matthew W. Tietze
BY
David A. Fox
ATTORNEY

ELECTRIC-INDUCTION TORQUE TRANSMITTER

Filed Jan. 29, 1954 3 Sheets-Sheet 3

INVENTORS
Henry S. Jacobs
Matthew W. Tietze
BY
Edward G. Fox
ATTORNEY

United States Patent Office 2,776,386

Patented Jan. 1, 1957

2,776,386

ELECTRICAL-INDUCTION TORQUE TRANSMITTER

Henry S. Jacobs, Shorewood, and Matthew W. Tietze, Brookfield, Wis., assignors to Harnischfeger Corporation, Milwaukee, Wis., a corporation of Wisconsin Application January 29, 1954, Serial No. 407,034

9 Claims. (Cl. 310—93)

Figures 1, 2:
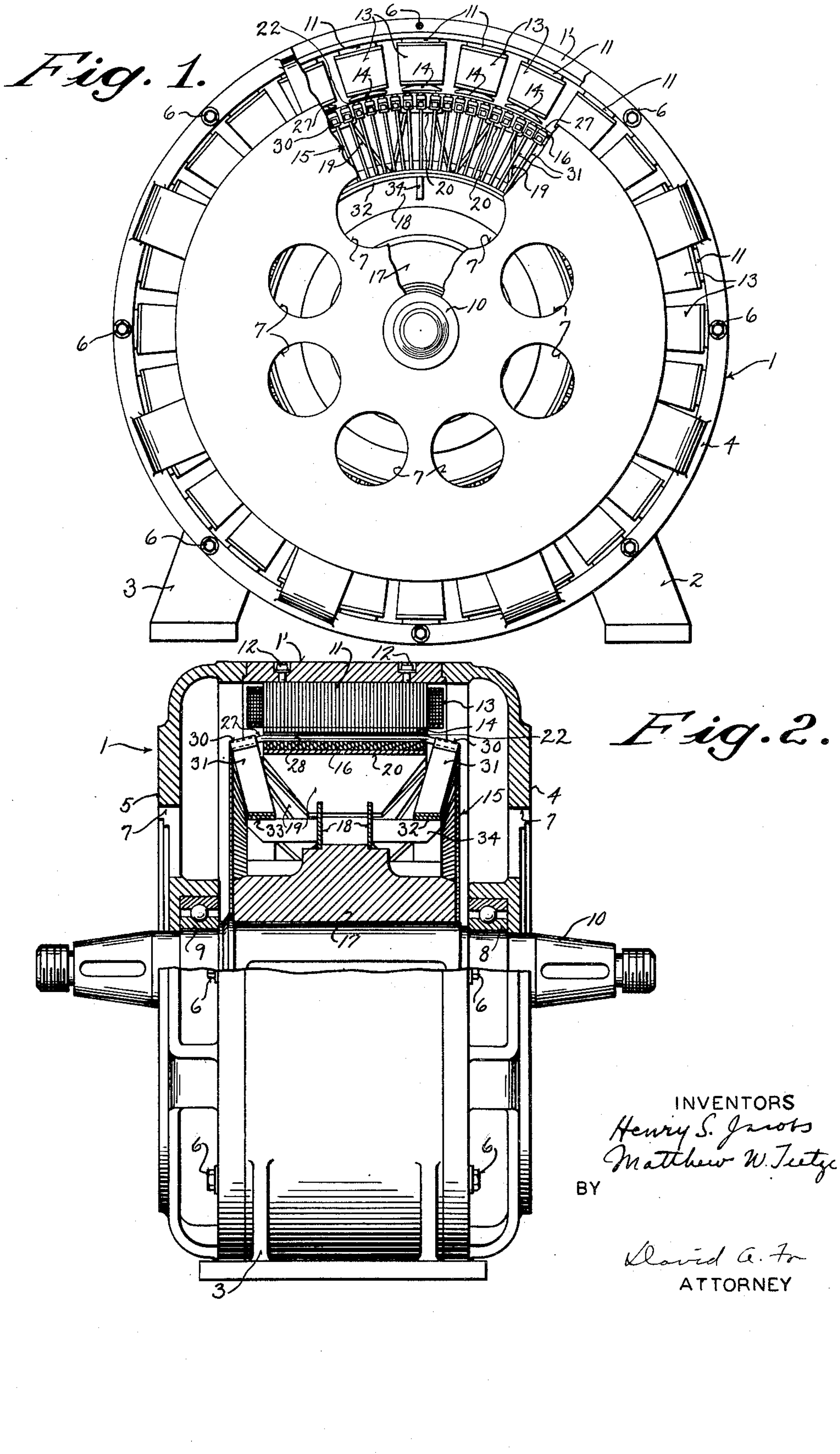

This invention relates to electrical-induction, mechanical-reaction machines or torque transmitters including clutches, brakes and motors, and it resides more particularly in an improvement therein suitable for uses where operation under high slip occurs, the improvement comprising a laminated magnetic member in flux conducting relation with a field member, the magnetic member having conductor bars mechanically held therein but electrically isolated therefrom by self-forming insulation, the bars being connected through external resistive fins so that heat evolution will be largely localized in the heat rejecting fin elements.

In the case of certain electric-induction machines, especially brakes and clutches, so-called eddy-current rotors have been employed in which a relatively thin band of electrically conductive magnetic material is called upon to carry the currents induced as well as the magnetic flux. Cooling fins united with and extending from the thin band extract heat for dissipation over the extended surface of the fins. In such constructions the immediate surface of the band, where most of the heat originates, operates at a temperature substantially higher than the remote portions of the fins since a large temperature gradient is required to compel conduction of the large quantity of heat evolved. Thermal stresses caused by the large temperature gradients become troublesome and only a small part of the fin surface can operate at optimum maximum temperatures.

In the case of certain motors intended to operate at high slip or to exhibit special starting characteristics a different approach has been attempted. In such machines the magnetic rotors have been laminated to inhibit the formation of eddy-currents therein and specialized squirrel cages have been embedded to provide induced current paths. In some instances, these specialized squirrel cages have included electrically resistive fins forming the end ring connections. The purpose of these constructions has been to cause the heat evolved to originate largely in the fins where it can be dissipated under favorable conditions.

It has been found, however, that this aim has not been realized to a degree sufficient to compensate for the increased cost of the laminated squirrel cage rotor as compared with a simple eddy-current band. This has been partly due to the fact that such rotors have not been designed to permit large torque to be developed under conditions of high slip frequency. The limiting factor, however, has been the failure of the fin structure to control excessive temperatures within the magnetic member in which the bars are embedded. Under conditions of high slip the induced voltages become high enough to produce substantial current flow within the laminations themselves which are in close and intimate contact with the conductor bars. This condition not only causes sufficient heat to be evolved within the rotor to bring about unsafe temperatures but it also is sufficiently severe so that there may be visible discharges between the bars and the laminations at points adjacent the air gap. These discharges, though small, are sufficient in themselves to cause consequential deterioration of the parts involved.

It is the discovery of this invention that where rotor bars of a specialized squirrel cage, including resistive fins in circuit, are mounted in an improved manner in a laminated rotor or magnetic member that a self-forming insulation is caused to be established which eliminates or largely reduces the flow of induced currents within the laminations, with a consequent major reduction in internal heating, and which eliminates or reduces to a harmless level visible electrical discharges between conductor bars and laminations. When rotors are so constructed they may be used under conditions of high slip without deterioration due to thermally induced stresses and related causes, without abnormally large air gap requirements and without deterioration caused by electrical discharge.

It is an object of this invention, therefore, to provide an electrical-induction, mechanical-reaction apparatus which may be employed under conditions of high slip without occurrence of unsafe temperatures.

Another object of this invention is to provide an apparatus of the class described wherein large torque in relation to the dimensions of the apparatus may be continuously exerted.

Another object of this invention is to provide a squirrel cage rotor construction for an apparatus of the type described which will be mechanically strong and capable of withstanding the high mechanical stresses imposed under conditions of rapid rotation and heavy torque loading.

Another object of this invention is to provide a method whereby a squirrel cage rotor may be formed wherein the cage is substantially isolated electrically from the laminations of the rotor by an effective electrical insulation not subject to deterioration under the temperature conditions prevailing in use and sufficiently strong to meet the mechanical stresses imposed.

The foregoing and other objects and advantages of this invention will appear from the description following which is set forth with reference made to the accompanying drawings forming a part hereof in which there is shown by way of illustration and not of limitation one form in which the apparatus of this invention may be constructed.

Figure 6:
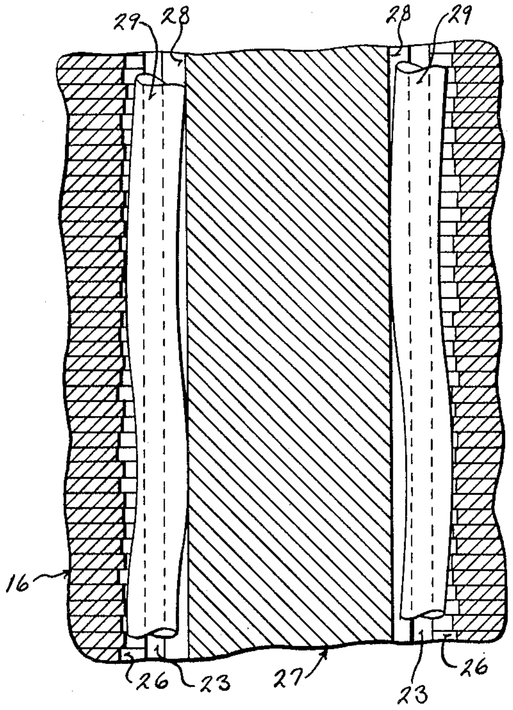
Figure 7:
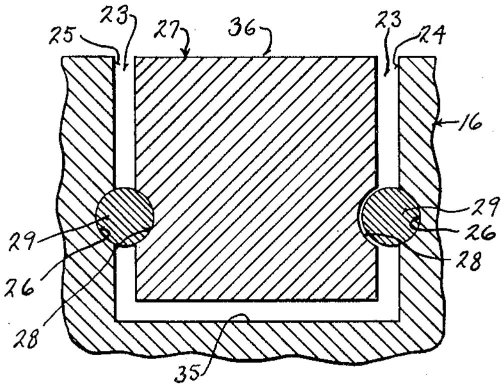
Figure 8:
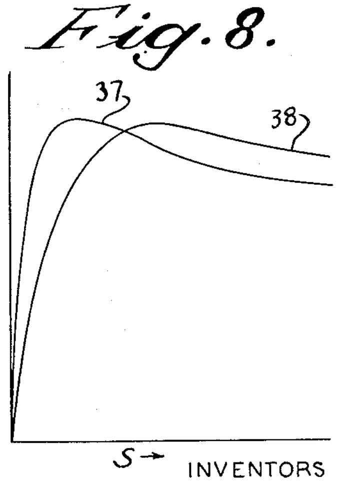

In the drawings:

Fig. 1 is an end view in elevation with parts broken away and in section showing an induced current brake embodying one form of the apparatus of this invention, Fig. 2 is a side view in elevation with parts broken away and in section of the apparatus appearing in Fig. 1, Fig. 3 is a fragmentary detailed view in end elevation and partly in section showing the fins and manner of embeddedment of some of the conductor bars of the rotor of the apparatus shown in Fig. 1, Fig. 4 is a fragmentary detailed top plan view of the rotor parts shown in Fig. 3, Fig. 5 is a greatly enlarged fragmentary detailed view in end elevation and in section of one of the rotor bars showing the manner of formation of insulation when the bars are held in place by locking keys, Fig. 6 is a detailed top plan view of the rotor bar shown in Fig. 5 the dimensional inaccuracies thereof being exaggerated for illustrative purposes, Fig. 7 is a fragmentary detailed end view in section greatly enlarged showing the conductor bar in the condition existing prior to curing, and Fig. 8 is a diagrammatic showing in coordinate graph form of the slip torque relationship of an apparatus constructed in accordance with this invention after completion as compared with the same properties of the apparatus prior to electrical isolation of the squirrel cage.

Referring now to the drawings, the apparatus of the invention there illustrated is shown in form adapted for use as an induced current brake. The brake is mounted on a frame 1 the main structural member of which is a magnetic field ring 1', carried on mounting feet 2 and 3. The field ring 1' is in the shape of a simple cylindrical band made up of suitable steel of good magnetic properties. Secured to the end faces of the field ring 1' are end bells 4 and 5 held in place by screws 6 as shown.

The end bells 4 and 5 are open around their outer peripheries for the escape of cooling air and are provided with a series of circumferentially placed holes 7 through which cooling air may enter. At the center of the end bells 4 and 5 bearing seats are provided for bearings 8 and 9 which carry for rotation, a shaft 10, extending outwardly through the end bells 4 and 5.

Mounted circumferentially of the internal surface of the field frame 1' and extending radially inwardly therefrom is a plurality of field poles 11 of magnetic material. The poles 11 are elongated axially as appears more clearly in Fig. 2 and are held in position by bolts 12. Surrounding the poles 11 are windings 13 joined in circuit to be supplied with exciting current to cause the poles 11 to be excited with alternately opposite polarities in known manner but not shown. The inner ends of the poles 11 are flanged to form pole shoes 14, the inner faces of which lie in a cylindrical surface.

An induced current rotor 15 having a cylindrical laminated armature core 16 is mounted for rotation upon the shaft 10 and spaced from the pole faces of the pole shoes 14 at a distance sufficient only for the requirements of mechanical clearance. This spacing or air gap is reduced to as small a value as possible to minimize magnetic reluctance for the purpose of ensuring as large an output as possible from a given size and weight of apparatus. In accordance with this invention and as more fully described hereinafter, the air gap may be maintained at a low value without danger of disappearance of the same under load.

To provide a mounting for the armature core 16 and to carry it in proper relation to the shaft 10 and the field members, there is secured on the shaft 10 a hub 17 from which two centrally disposed discs or diaphragms 18—18 extend outwardly as shown. The discs 18 are attached to the hub 17 by welding and are slotted around the peripheries thereof to accommodate the inner ends of outwardly extending spoke plates 19 which are arranged in pairs and which terminate at their outer extremities beneath bolsters 20 which are secured thereto by welding. The bolsters 20 are in the form of short cylindrical segments the outer surfaces of which are disposed in a common cylindrical envelope approximating the internal diameter of the armature core 16.

The armature core 16, as previously noted, is made up of a plurality of laminations of magnetic material stacked to form a drum which will fit closely about the outer surface of the bolsters 20. To facilitate the placing of the laminations of the armature core 16 upon the bolsters 20 they may be preheated. After being mounted in place upon the bolsters 20 the laminations are welded thereto as indicated at 21 in Fig. 3. This welding action further heats the armature core 16 prior to the solidification of the weld metal so that during welding a clearance develops between the bolsters 20 and the armature core 16 in the vicinity of the weld being made. Weld metal thus is permitted to flow into the space between the laminations and the bolsters 20. During cooling, the laminations suffer a greater average temperature drop than the parts forming the hub and spokes of the drum assembly 15 with the result that thermally induced tension is established within the armature core 16 when it is cold. Under normal operation, during which the temperature of the armature core 16 is considerably higher, this tension is relieved and stress, due to thermal expansion, is, consequently, minimized.

Extending transversely across the laminations, forming the armature core 16, is a plurality of spaced slots 23 which are substantially square in section and which open outwardly transversely across the air gap surface of the armature core 16, that is the surface which faces the pole shoes 14 across the air gap 22. Along the side faces 24 and 25 of the slots 23 locking grooves 26 are provided for a purpose to be described.

Nearly filling the slots 23 and extending entirely across and beyond the side margins of the armature core 16 are a plurality of conductor bars 27 composed of a highly conductive material such as copper or aluminum or other suitable metal which, when brought to a suitable temperature, is subject to oxidation with the formation of an adherent oxide film having dielectric properties.

The bars 27 are shaped with longitudinal grooves 28 extending along the sides in alignment with the grooves 26 in the armature core 16 to provide a path for locking keys or rods 29 which retain the bars 27 in position as shown more clearly in Fig. 5. The ends of the bars 27, as noted above, extend beyond the side margins of the armature core 16 and these lateral extensions are fitted within and intimately joined electrically with metallic sleeves 30 by a fused metallic bond. The inner faces of the sleeves 30 are joined by welding to electrically resistive cooling fins 31 which extend inwardly radially to a welded connection with end rings 32 and 33 appearing in Figs. 1 and 2.

The end rings 32 and 33 are braced and strengthened by a plurality of brackets 34 secured to the discs 18 and spaced at intervals around the circumferences thereof. The bars 27 are thus joined in circuit to provide closed electrical paths in which induced currents may flow when the drum 15 is rotated in relation to the field poles 11, the latter being magnetized by electrical excitation. The field formed by such induced currents resists the relative rotation mentioned causing torque to be transmitted between the field member and the rotating drum.

Substantial electrical currents are induced in this manner and the energy subjected to degradation on this account appears as heat which must be dissipated. Where the resistance of the fins 31 is high in relation to the resistance of the bars 27, a major part of the heat to be dissipated will originate in the fins 31 provided the bars 27 are, in substantial degree, electrically isolated.

It has been found that in brakes and clutches where operation under high slip conditions is frequent that the voltages induced in the bars 27 are substantial, notwithstanding the high conductivity thereof and that if such bars are permitted to operate in close and intimate contact with the sides 24 and 25 of the slots 23, that a large portion of the currents induced, flows entirely within the armature core 16 and the bars 27, and is not carried to the fins 31 where degradation to heat it is intended to occur. To some extent this difficulty is aggravated by intimate contact between the inner face of the bars 27 and the inner surface 35 of the grooves 23. This contact, however, is not as serious since its pressure of engagement is not augmented by thermal expansion of the bar 27.

In order that substantial torque be transmitted at high slip frequency it is desirable that the outer face 36 of the bars 27 be located substantially flush with the outer surface of the armature core 16. If the bars 27 are thus mounted and held in place by means of the locking keys or rods 29, which are preferably formed of stainless steel or other high resistivity metal, the bars are suspended as it were, that is spaced a substantial distance from the side and inner surfaces of the slots within which they are received. To this end the bars 27 are preferably of such dimension that there will be an average clearance cold of from 0.003 to 0.004 inch between the bar and the armature core 16 entirely around the bar.

In Fig. 6, the locking rods 29 are shown enlarged and non-rectilinear the departure from straightness being markedly exaggerated in the drawing for the purpose of illustration. In an actual construction perfect straightness of the locking rods 29 is not possible nor are the bars 27 or the grooves 28 therein perfectly straight. Furthermore, the laminations forming the armature core 16 although stacked with the usual accuracy will not form perfectly straight slots 23 and the walls thereof and the grooves 26 will be staggered to a very considerable degree the same being indicated and exaggerated in Fig. 6. As a result the locking rods 29 must be capable of resilient deflection in order to permit them to be driven into place. As a result the rods 29 will accommodate thermal expansion of the bars 27 without undue stresses resulting and without any perceptible mechanical loosening of the bars on cooling. At the same time, electrical connection between the bars 27 and the core 16 is limited to restricted areas of contact widely spaced.

When the bars 27 are shaped, as above described, and mounted in the armature core 16 by means of the locking rods 29 there is free and ready access of atmospheric oxygen to all sides of the bar 27. This allows formation of an adherent insulating coating 39 thereon. This is caused to form by subjecting the assembled rotor to alternate heating and cooling between a lower temperature not more than about 200° C. and an upper temperature of 450° C. in cases where the bars 27 are formed of copper. This treatment produces an adherent coating of cupric oxide on the surface of the bars 27 which furnishes an effective barrier to the flow of current between bars 27 and the laminations of core 16. Under normal conditions of usage, this barrier is effective to markedly increase the electrical resistance between bar and slot wherever an incidental contact between them may occur. The insulating effect thus produced remains consistent and extends throughout the life of the apparatus. The continued maintenance of the insulation is dependent, in substantial measure, upon the fact that if destroyed, and the layer is extremely thin and withstands little abrasion, it is self-restoring due to the local temperature rise which will occur, but any such rise will become checked by the new layer formed before damage ensues.

The oxidation procedure preferably followed in the case of copper is to hold one member of the apparatus while rotating the other. For example, the drum assembly 15 may be so rotated while exciting the field to bring the drum 15 fairly rapidly to a temperature of 450° C. Speed or excitation or both may then be reduced to hold this temperature for twenty minutes. The parts are then allowed to cool to 200° C. or lower by further reduction of excitation or speed or both, after which the temperature is again brought to 450° C. as before. The alternate heating, cooling and reheating is repeated until the resistance between bars and armature core ceases to rise. Ordinarily four cycles are sufficient for this purpos.

Increasing the temperature by current induced in the bars in the case of large apparatus calls for facilities capable of large horsepower output for driving the shaft 10. Under such conditions, methods of external heating may be found more satisfactory.

The manner in which insulation is established by oxidation is shown more clearly in Figs. 5 and 7. As an instance, when a bar 27 is initially mounted in a groove 23 the bar 27 is without an oxide coating. At the same time, it is isolated to some extent from the armature core 16 because of the limited areas of contact between the bar 27 and the rods 29 which are of higher electrical resistance. As appears at the right of Fig. 7, and in Fig. 6, the rods 29 may be out of contact with the bar 27, or for that matter the armature core 16, over a substantial part of their lengths. The apparatus of this invention, even without formation of an oxide coating, therefore, may operate in a manner giving rise to less heating of the armature core 16 than would be the case where bars, such as 27, were forced into a tight fit in the grooves 23 or were formed therein by casting.

Not only does the intimate contact achieved by the methods of mounting the bars heretofore used defeat the purpose which applicants achieve, but the access of atmospheric oxygen is sharply curtailed, depriving the apparatus of a full opportunity to form a self-repairing oxide insulation layer.

As appears in Fig. 8, the formation of an effective insulation layer gives rise to changes in characteristics particularly slip-versus-torque characteristics, under constant excitation which may be readily measured. For example, as appears in Fig. 8, a brake prior to the temperature treatment above described may exhibit the slip-versus-torque properties appearing in the curve designated 37. Under conditions of low slip, torque will remain relatively high by reason of the lower effective internal resistance of the induced current paths. However, as slip increases there is a preceptible falling-off from the maximum torque obtainable because of the higher inductive impedance. After the bars 27 become isolated electrically, as a result of oxidation induced by heat, the brake or clutch will acquire the properties indicated in curve 38 wherein it appears that at lower slip there is a more pronounced falling-off in torque due to the higher non-inductive impedance while at higher slip values the torque remains consistently above that which prevailed before the electrical insulation of the bars 27 was formed.

While it is known that conductor bars or windings contained in rotors have heretofore been insulated, such insulation has occupied a large space detrimental to the magnetic properites of a rotor containing the same. Furthermore, such insulation has been susceptible to deterioration under high temperature conditions which in a clutch or brake are not easily avoided. In accordance with applicants' improvement the space allotted to the insulation is insignificant and the electrical isolation of the bars is improved rather than damaged by an unexpected temperature rise. Furthermore, the insulation is self-forming and if destroyed by movement under working stresses existing in the apparatus it becomes re-established.

As a result, a large and consistent quantity of heat is caused to be dissipated through the fins 31, under conditions of heavy load, permitting the rise of temperature in the armatuer core 16 and bars 27 to be restricted below dangerous levels.

It is entirely permissible for the armature core 16 to operate at temperatures as high as 400° C. since no substantial damage occurs at such temperature. Where the apparatus of this invention is operated to bring about such a rise in the armature core 16 adequate capacities per pound of weight and unit of space occupied is attained; such capacities extending beyond that obtainable with larger and heavier apparatus of the type heretofore available.

The apparatus disclosed may be operated either as a clutch or a brake. In case it is desired to operate the apparatus as a clutch means may be provided in well-known manner, not shown, which mount the field member as well as the rotor 15 for rotation. In certain instances where motor operation under conditions of high slip is required the field of the apparatus shown in the drawings properly laminated may be excited by alternating current in well-known fashion to produce a rotating field whereupon the apparatus will function as a squirrel cage induction motor capable of withstanding long running under high slip and having exceptional pull-out and starting characteristics.

We claim:

1. In an induced-current torque transmitting apparatus having a circumferentially extending magnetic field member capable of producing a flux pattern with angularly spaced magnetic poles and a magnetic induced current member relatively rotatable with respect to and swept by the flux of the field produced by said field member and separated from said field by an air gap, the improvement in said induced current member which comprises a circumferentially extending armature core of laminated magnetic material, a support for said armature core mounting the same in position spaced from and concentric with said field while permitting said relative rotation, said armature core having an air gap surface thereon adjacent the air gap between the same and said field, a plurality of slots in said armature core extending inwardly from the air gap surface thereof and across said surface transversely with respect to the sweep of said field flux, said slots having two side faces rising from the margins of an inner face, conductor bars of highly electrically conductive oxidizable metal received in said slots, said bars having an exposed face substantially flush with said air gap surface and side surfaces facing the side faces of said slots, said bars having longitudinally extending shoulders extending along the sides thereof, retaining means extending along the side faces of said slots engaging the shoulders on said bars for retaining said bars in said slots, an electrical insulating oxidation coating on the surfaces of said bars to increase the resistance of electrical contact between said bars and said locking means and between the bars and the surfaces of said slots, said insulating coating being formed of oxide resulting from interaction of atmospheric oxygen with the metal of said bars, a plurality of electrically resistive heat dissipating fins, and electrical connections joining said bars in circuit with said fins to form completed induced current paths capable of giving rise to torque producing fields between said field member and said induced current member when the armature core thereof is swept by said field flux.

2. A torque transmitter in accordance with claim 1, wherein the bars are of copper and the coating thereon is cupric oxide.

3. A torque transmitter in accordance with claim 1 wherein the locking means for retaining the bars comprise key rods received in coves extending longitudinally along the sides of said bars forming the retaining shoulders thereon and in adjacent coves in the side surfaces of said slots.

4. A torque transmitter in accordance with claim 1 wherein the armature core is provided with slots substantially wider than said bars when cold and in which locking keys are disposed between and in contact with the sides of the bars and the sides of the slots to maintain said bars spaced from the sides and the inner face of said slots.

5. In an induced-current torque transmitting apparatus having a magnetic field member with angularly spaced magnetic poles having pole faces disposed in a cylindrical surface and a cylindrical magnetic induced current member relatively rotatable with respect to and swept by the flux of the field produced by said field member and separated from said field by an air gap, the improvement in said induced current member which comprises a cylindrical armature core of laminated magnetic material, a support for said armature core mounting the same in position spaced from and concentric with said field while permitting said relative rotation, said armature core having an air gap surface thereon adjacent the air gap between the same and said field, a plurality of axially extending slots in said armature core extending inwardly from the air gap surface thereof and across said surface transversely with respect to the sweep of said field flux, conductor bars of highly electrically conductive oxidizable metal received in said slots, said bars having an exposed face substantially flush with said air gap surface, the major portion of the remaining surfaces of said bars being spaced from and out of contact with the side surfaces and inner faces of said slots, locking means engaging said bars to retain the same in said slots, an electrical insulating oxidation coating on the surfaces of said bars to increase the resistance of electrical contact between said bars and said locking means and between the bars and the surfaces of said slots, said insulating coating being formed of oxide resulting from interaction of atmospheric oxygen with the metal of said bars, a plurality of electrically resistive heat dissipating fins, and electrical connections joining said bars in circuit with said fins to form completed induced current paths capable of giving rise to torque producing fields between said field member and said induced current member.

6. A torque transmitter in accordance with claim 5, wherein the bars are formed of copper and the coating thereon is cupric oxide.

7. In an induced-current torque transmitting apparatus having a magnetic field member with angularly spaced inwardly extending magnetic poles having pole faces disposed in a common cylindrical surface and a magnetic induced current drum relatively rotatable with respect to and disposed within said field to be swept by the flux of the field produced by said field member and separated from said field by an air gap, the improvement in said induced current member which comprises a cylindrical armature core of laminated magnetic material, a hub and wheel support for said armature core mounting the same in position spaced from and concentric with said field while permitting said relative rotation, said armature core having an outer cylindrical air gap surface thereon adjacent the air gap between the same and said field, a plurality of slots in said armature core extending inwardly from the air gap surface thereof and across said surface transversely with respect to the sweep of the field flux produced by the field, copper conductor bars in said slots, said bars having longitudinally extending grooves extending along the sides thereof and the sides of said slots having slot grooves therein adjacent said bar grooves, locking rods extending along and within the slot grooves engaging and received within said bar grooves to retain said bars in said slots, a plurality of electrically resistive heat dissipating fins, and electrical connections joining said bars in circuit with said fins to form completed induced current paths capable of giving rise to torque producing fields between said field member and said induced current member.

8. A torque transmitter in accordance with claim 7, wherein the locking rods are resiliently conformed to the channels formed by the adjacent bar grooves and slot grooves to retain the bars without loosening under thermally induced temperature changes.

9. The method of forming a squirrel cage rotor in which electrical contact between copper rotor bars therein and the rotor armature core is restricted which method consists in the steps of providing atmospheric oxygen access to the side surfaces of the rotor bars then raising the temperature of the bars to about 450° C., maintaining said temperature for a substantial interval while permitting access of atmospheric oxygen, cooling said bars to a temperature below 200° C., and then repeating the heating and cooling until an insulating coating of cupric oxide is formed on said bars.

References Cited in the file of this patent

UNITED STATES PATENTS

| | | |
|---|---|---|
| 2,003,587 | Fahlman | June 4, 1935 |
| 2,188,398 | Bernard | Jan. 30, 1940 |

FOREIGN PATENTS

| | | |
|---|---|---|
| 238,169 | Great Britain | Aug. 5, 1925 |
| 224,525 | Great Britain | Feb. 5, 1925 |
| 377,665 | Great Britain | Jan. 23, 1931 |
| 479,225 | Great Britain | Feb. 2, 1938 |
| 922,118 | France | Jan. 27, 1947 |